(12) United States Patent  
Kirkness

(10) Patent No.: US 8,371,636 B1
(45) Date of Patent: Feb. 12, 2013

(54) SHIELD

(75) Inventor: Neil William Kirkness, Carine, WA (US)

(73) Assignee: Neil W. Kirkness, Carine, WA (US)

( * ) Notice: Subject to any disclaimer, the term of this patent is extended or adjusted under 35 U.S.C. 154(b) by 1270 days.

(21) Appl. No.: 12/125,504

(22) Filed: May 22, 2008

(51) Int. Cl.
*B60N 2/02* (2006.01)

(52) U.S. Cl. ............................. 296/68.1; 2/2.5; 89/36.01

(58) Field of Classification Search ................. 296/68.1; 2/2.5; 89/36.01, 36.11, 36.12, 36.13, 36.16, 89/36.17

See application file for complete search history.

(56) References Cited

U.S. PATENT DOCUMENTS

| | | | | |
|---|---|---|---|---|
| 3,049,363 A | * | 8/1962 | Marx | 280/748 |
| 3,214,117 A | * | 10/1965 | James et al. | 244/122 A |
| 7,150,688 B1 | * | 12/2006 | Coulbourn | 473/415 |
| 7,383,761 B2 | * | 6/2008 | Warren et al. | 89/36.02 |
| 7,921,759 B2 | * | 4/2011 | Warren | 89/36.17 |
| 8,074,553 B1 | * | 12/2011 | Warren | 89/36.02 |
| 2010/0251883 A1 | * | 10/2010 | Naroditsky | 89/36.02 |

* cited by examiner

*Primary Examiner* — Lori Lyjak
(74) *Attorney, Agent, or Firm* — Blank Rome LLP

(57) ABSTRACT

A shield configured for use within a vehicle for protecting an occupant of a seat in the vehicle from a force emanating from at least a region beneath the occupant. The seat has a supporting surface for supporting the occupant. The shield includes a deflecting member having more than one deflecting surface portion for deflecting the force away from the seat. The deflecting member is positioned near a side of the seat opposite the supporting surface of the seat, and the deflecting surface portions are each inclined in a direction toward each other at a first edge and away from the seat at a second edge.

30 Claims, 9 Drawing Sheets

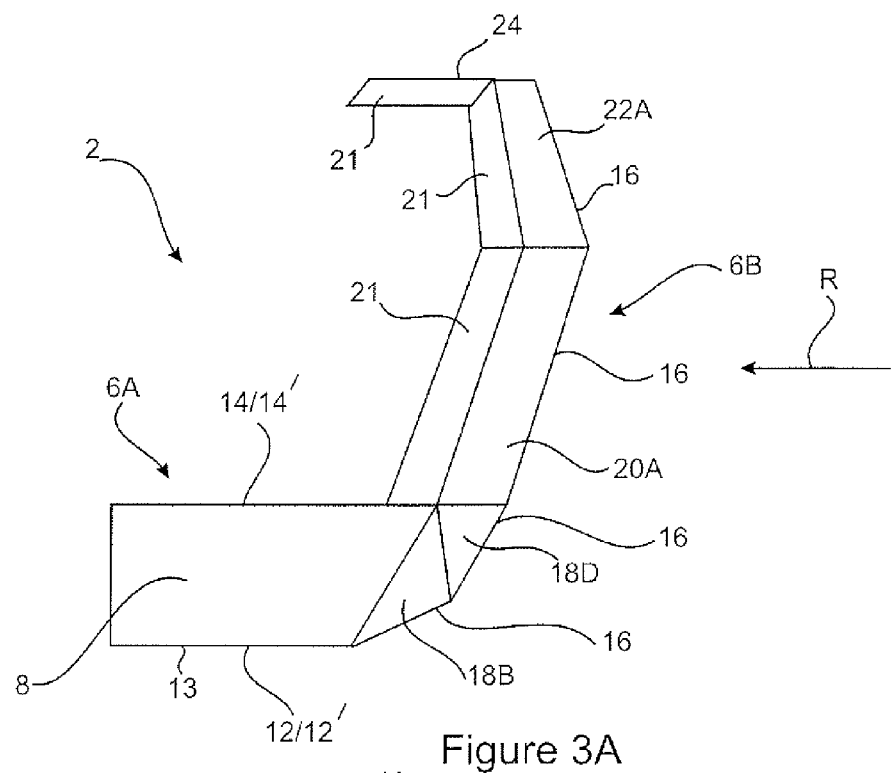
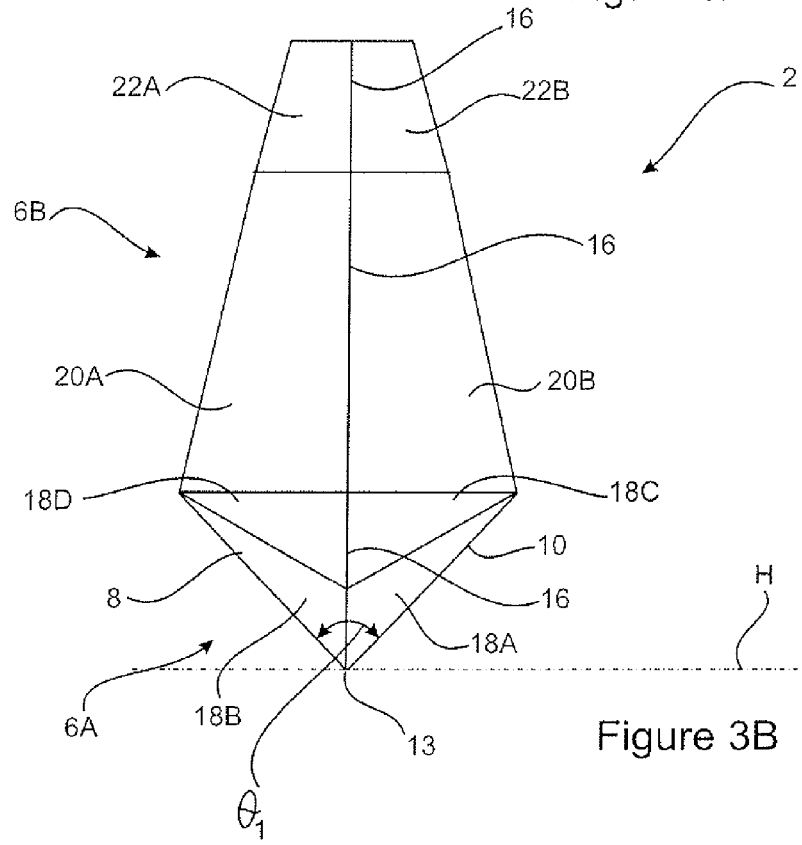
Figure 3A
Figure 3B

SHIELD

FIELD OF THE INVENTION

The present invention relates to a shield for use with a seat.

BACKGROUND OF THE INVENTION

A significant problem for military and peace-keeping personnel travelling across former or current militarised territory is the risk of exposure to landmines. Landmines are configured to release an explosive charge when activated underneath a vehicle. Once the charge is initiated, the occupants of the vehicle are susceptible to serious injury or death by the shockwave and/or blast forces that may penetrate the understructure of the vehicle. In many instances, the ground has a tendency to focus the forces substantially upwards.

Attempts to increase safety have focused on the design and development of the chassis of vehicles where the under-structure has been modified to enhance the resistance to the shockwave and impact from shrapnel or like debris. The result of such efforts has proven problematic in cost and operation given the significant degree of re-design required to accommodate the necessary running equipment, i.e., floor plan structure, differentials, axels, and the like. Operation of such revised designs can present further risk to personnel operating such vehicles when used in adverse territory due to, for example, changes in stability and operational reliability.

It will be clearly understood that, although prior art use(s) and publication(s) may be referred to herein, any such reference(s) do not constitute an admission that any of these form a part of the common general knowledge in the art, in the United States or in any other country.

SUMMARY OF THE INVENTION

Accordingly, to solve at least the above problems and/or disadvantages and to provide at least the advantages described below, a non-limiting object of the present invention is to provide a shield configured for use within a vehicle for protecting an occupant of a seat in the vehicle from a force emanating from at least a region beneath said occupant, the seat having a supporting surface for supporting an occupant and said shield comprising a deflecting member having more than one deflecting surface portion for deflecting said force away from said seat, wherein said deflecting member is positioned near a side of said seat opposite said supporting surface of said seat and wherein said more than one deflecting surface portions are each inclined in a direction toward each other at a first edge and away from the seat at a second edge.

In addition, said deflecting member of the shield may comprises a first deflecting portion having first and second deflecting surface portions wherein said first and second deflecting surface portions converge toward each other at a first edge and away from said seat at a second edge. Said first and second deflecting surface portions may be arranged relative one another so that a first internal angle formed between each of said respective surface portions is greater than 0 degrees and less than 180 degrees. Said supporting surface may positioned substantially central to the first and second deflecting surface portions. Said first and second deflecting surface portions may be arranged opposite one another to form a substantially "V" shaped arrangement wherein the apex of said "V" shape defines a first apex edge for deflecting the force away from said set when the force emanates from beneath the shield. Said first apex edge may be distal of, and substantially central of, said seat.

The shield may further comprise a second deflecting portion coupled to and extending substantially away from said first deflecting portion for protecting a rear side of said occupant. Said second deflecting portion may comprise third and fourth deflecting surface portions arranged relative one another so that a second internal angle is formed between each of said respective surface portions, said angle being greater than 0 degrees and less than 180 degrees. Said third and fourth deflecting surface portions may converge towards each other at one edge. Said supporting surface may be positioned substantially central to said third and fourth deflecting surface portions. The cross-sectional shape of the second deflecting portion may be substantially "V-shaped" wherein the apex of said "V" shape defines a second apex edge arranged between the seat and a rear of the vehicle for deflecting force away from the seat when a force originates from behind the shield. Said second apex edge may be distal of, and substantially central of, said seat. Said second deflecting portion may be movable relative to said first deflecting portion.

Said second deflecting portion may be operatively associated with the first deflecting portion in a telescoping arrangement. Said first and second deflecting portions may be configured with more than one deflecting surface portions. And, said first and second deflecting portions may further include additional deflecting surface portions arranged to protect the occupants head from contacting the ceiling of the vehicle.

The shield may be configured such that the shield includes a deflecting member having more than one deflecting surface portion, wherein said deflecting member is positioned near a side of said seat opposite said supporting surface of said seat and wherein said more than one deflecting surface portions are formed in a substantially convex manner about said seat for deflecting said force away from said seat. In this configuration, said deflecting member may have a cross-sectional shape that is substantially "V-shaped" wherein the apex of said "V" shape defines a first apex edge arranged to be positioned between the seat and a floor of the vehicle for deflecting force away from the seat when the force originates from beneath the shield. Also in this configuration, said first apex edge may be distal of, and substantially central of, said seat.

The shield of the additional configuration may further include a second deflecting portion coupled to and extending substantially away from said first deflecting portion for protecting the rear side of said occupant. The cross-sectional shape of the second deflecting portion of the additional configuration also may be substantially "V-shaped" wherein the apex of said "V" shape defines a second apex edge arranged intermediate the seat and the rear of the vehicle for deflecting force away from the seat when a force originates from behind the shield. Said second apex edge of the additional configuration may be distal of, and substantially central of, said seat, and the second deflecting portion may be movable relative said first deflecting portion. Said second deflecting portion may be operatively associated with the first deflecting portion in a telescoping arrangement. The additional configuration may further include additional deflecting surface portions are arranged to protect the occupants head from contacting the ceiling of the vehicle.

It is also a non-limiting object of the present invention is to provide a method of augmenting occupant safety in a vehicle, the method comprising forming a shield with a deflecting member having more than one deflecting surface portion for deflecting a force away from a seat, the step of forming a shield comprising forming the deflecting member on a side of the seat opposite to a supporting surface for supporting an occupant and forming each of said more than one deflecting surface portions to be inclined in a direction toward each other at a first edge and away from the seat at a second edge, and installing said shield in the vehicle. The step of installing said shield may include mounting the shield on at least one surface of the vehicle so that the deflecting member is disposed between the seat and the at least one mounting surface.

In any of the configurations or the method, the seat may be configured to be removably attached to the shield. The seat may also be formed integral with said shield. In addition, the vehicle may comprises of any one of the following: an automobile; a truck; a military tank; an armoured truck; an aircraft; a helicopter; sea vehicle (i.e., boat, ship etc); Land Craft Air Cushion (LCAC); hovercraft; landing craft.

These and other objects of the invention, as well as many of the intended advantages thereof, will become more readily apparent when reference is made to the following description, taken in conjunction with the accompanying drawings.

BRIEF DESCRIPTION OF THE FIGURES

The above and other aspects of the present invention will be more apparent from the following detailed description of exemplary embodiments with reference to the accompanying drawings, in which:

FIG. 3A shows a side elevation view of a further embodiment in accordance with present invention;

FIG. 3B shows an rear elevation view of the embodiment shown in FIG. 3A;

DETAILED DESCRIPTION OF EXEMPLARY EMBODIMENTS

Figure 1:
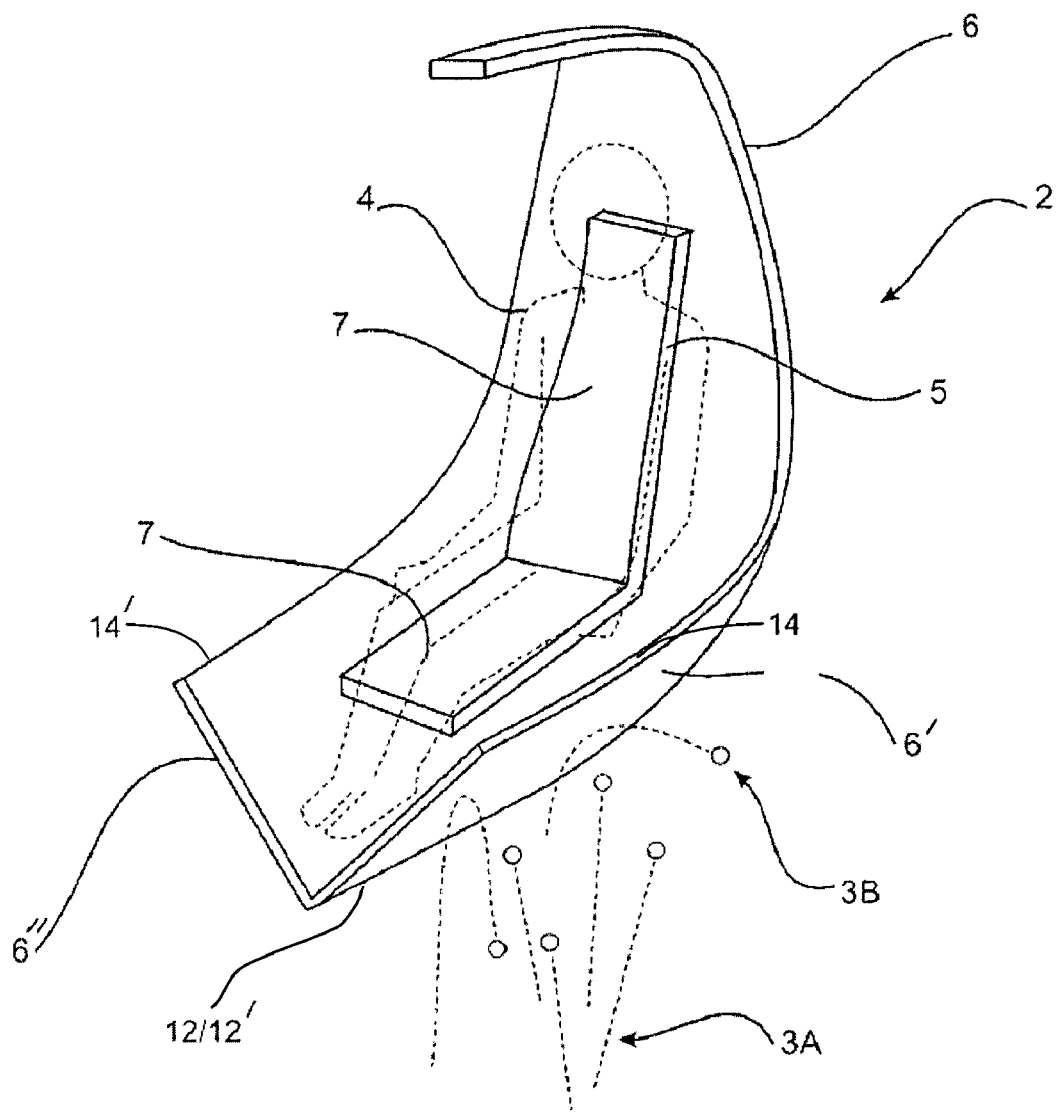
FIG. 1 shows an orthogonal view of one embodiment in accordance the present invention.

FIG. 1 shows an embodiment of a shield 2 configured for use within a vehicle (not shown) for protecting an occupant 4 of a seat 5 in the vehicle from a force 3A emanating from a region substantially behind (not shown) or beneath the occupant 4. The seat 5 comprises a supporting surface 7 configured for supporting the occupant 4. The shield 2 further comprises at least one deflecting member 6 arranged for positioning near a side of the seat 5 that is opposite the supporting surface 7 of the seat 5. The deflecting member 6 further comprises at least two additional deflecting surfaces 6' and 6" that are inclined in a direction toward each other at a first edge 12 and 12' respectively and away from the seat 5 at a second edge 14 and 14' respectively.

Figure 2A:
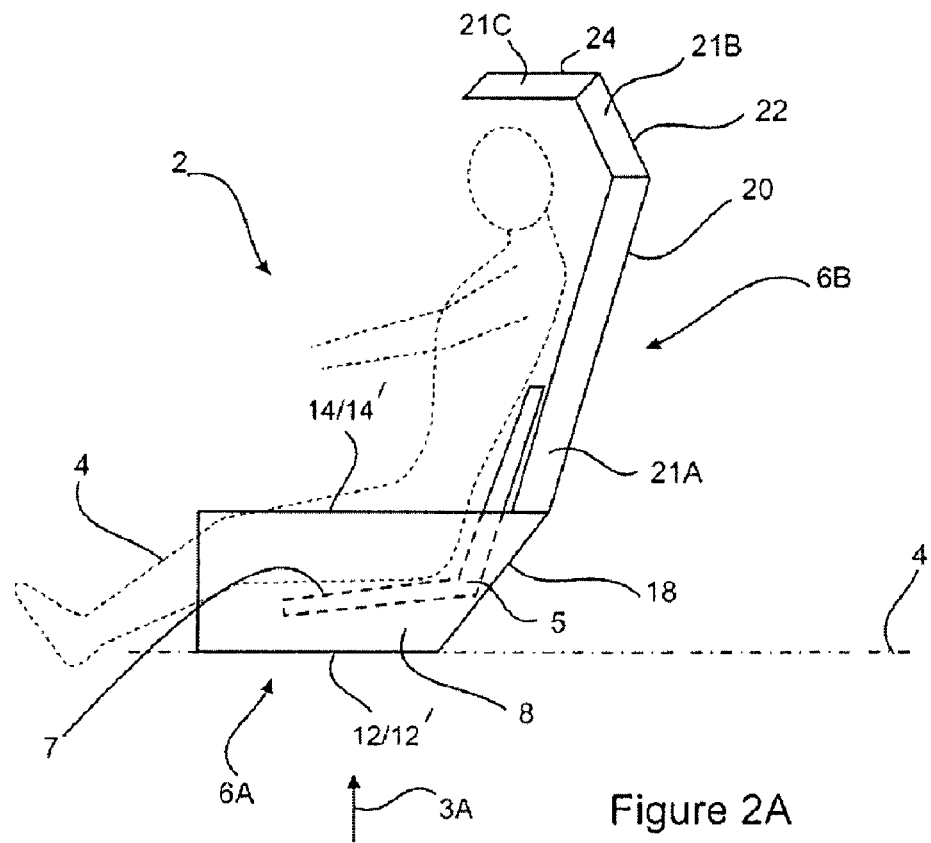
FIG. 2A shows a side elevation view of another embodiment in accordance with the present invention.
Figure 2B:
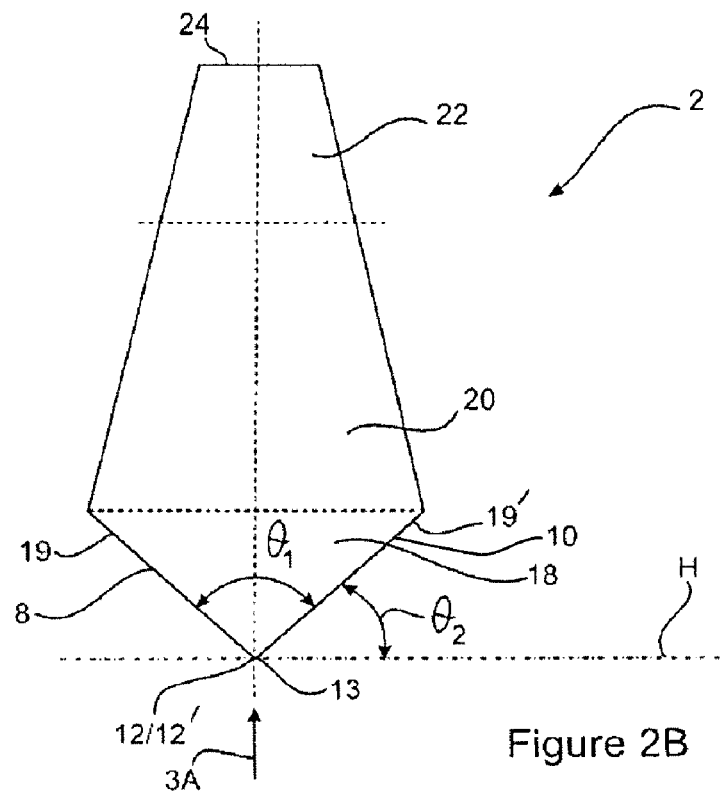
FIG. 2B shows a rear elevation view of the embodiment shown in FIG. 2A.

A further embodiment of the shield 2 is shown in FIGS. 2A and 2B where the shield 2 comprises a first deflecting portion 6A and a second deflecting portion 6B. The first deflecting portion 6A comprises two deflecting elements 8 and 10 each having respective deflecting surfaces. The deflecting elements 8 and 10 each further comprise first edges 12 and 12' respectively, and, second edges 14 and 14' that oppose first edges 12 and 12' respectively. The first edges 12 and 12' are joined or coupled together to form an apex which defines a first apex edge 13.

The deflecting elements 8 and 10 each extend away from the apex edge 13 so that a first internal angle $\theta_1$ formed between elements 8 and 10 about the apex edge 13 is greater than 0 degrees and less than 180 degrees. For the embodiment shown in FIG. 2, first internal angle $\theta_1$ is such that second edges 14 and 14' are substantially opposite one another with the seat 5 centrally disposed therebetween. In this configuration, deflecting elements 8 and 10 are arranged to form a substantially "V" shaped cross section as shown in FIG. 2B. The "V" arrangement of the deflecting portions 8 and 10 is configured so that force 3A emanating from beneath the shield 2 is deflected away 3B from the seat 5, and thus the occupant 4, by deflecting surfaces of elements 8 and 10.

It will be appreciated that the deflecting elements 8 and 10 may each be arranged to form any first angle $\theta_1$ that may facilitate deflection of force 3A that may be appropriate for the internal layout of a given vehicle. In one embodiment, the combination of the deflecting elements may not be disposed with the seat 5 centrally located therebetween, but rather the center of the seat 5 could be off-set and/or oriented at any first external angle $\theta_2$ from a horizontal plane H.

The second deflecting portion 6B may comprise a further arrangement of deflecting elements for protecting the rear most side region of the seated occupant 4 from a force that may originate from behind the occupant. For the embodiment shown in FIGS. 2A and 2B, the second deflecting portion 6B comprises a deflecting element 18 that is joined or coupled with edges 19 and 19' of deflecting elements 8 and 10 respectively, wherein edges 19 and 19' extend adjacent to the first edges 12 and 12' and the second edges 14 and 14' respectively. The second deflecting portion 6B further comprises deflection elements 20, 22 and 24 which are joined or coupled together at respective adjacent edges. For the embodiment of the second deflecting portion 6B shown in FIGS. 2A and 2B, the cross-sectional form is generally flat. Deflecting portion 6B further comprises additional deflecting elements 21A, 21B and 21C (hereinafter "21") that are also attached to deflecting elements 20, 22 and 24 respectively for protecting the back and/or sides of the occupant 4 as shown in FIG. 2A. It will be appreciated that deflecting portions 21 may be either omitted or configured to be removably attached from the second deflecting portion 6B.

Additional deflecting elements 21 may also be arranged for protecting the head of the occupant as depicted in the embodiments shown in FIGS. 1, 2A, 3A, 3C, 5A, 5B, 6A, 6B and 7. The situation may occur where, for example, a blast force emanates from below the shield 2 effecting to dislodge it from its attachment to the floor of the vehicle. In this situation the shield 2 may be directed upwards towards the ceiling structure of the vehicle placing the occupants head at risk from injury due to impact and associated compressive forces. The additional deflecting elements 21 arranged for protecting the occupants head may be formed to be rigid so as to deflect only a minimal amount as a result of the impact, or, may be formed to deform so as to dampen the impact forces that may be imparted to the occupant. Further, the additional deflecting elements 21 may be formed integral with the deflecting portion 6B or may comprise a separate component that is removably attached to deflecting portion 6B (not shown).

In one embodiment, deflecting elements 8 and 10 of the first deflecting portion 6A and deflecting elements 18, 20, 22, 24 and 21 of the second deflecting portion 6B may be coupled together using any known fastening means such as, for example, nut/bolt arrangements or standard metallic or plastic welding methodologies depending upon the construction material selected. Alternatively, the first 6A and second 6B deflecting portions may be each formed as individual integral components so as to form separate monocoque components. Further, first 6A and second 6B deflecting portions may be formed as a single monocoque deflecting structure.

Figure 8A:
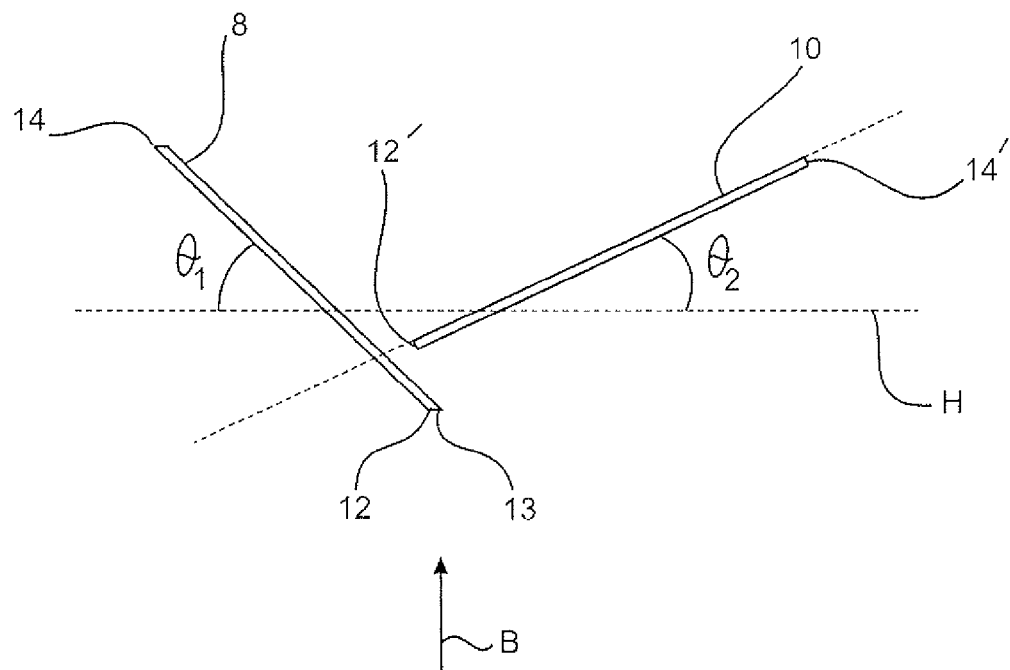
FIG. 8A shows a rear sectional view of an alternative arrangement of the first deflecting portion in accordance with the present invention.

It will be appreciated that the deflecting elements 8 and 10 may be arranged so that the first apex edge 13 comprises an edge of either deflecting element that may be positioned distal to the point of connection of said elements as shown in FIG. 8A. For the arrangement shown, the distal-most edge 12 of deflecting element 8 forms the apex 13 of the generally "V" shaped arrangement. Further, the edge 12' of deflecting element 10 may be joined directly with deflecting element 8 in the alignment shown using, for example, known welding methods for plastics or metallic materials, or coupled using a mechanical coupling means, such as, for example, using nut/bolt arrangements or known welding methods.

Figure 3C:
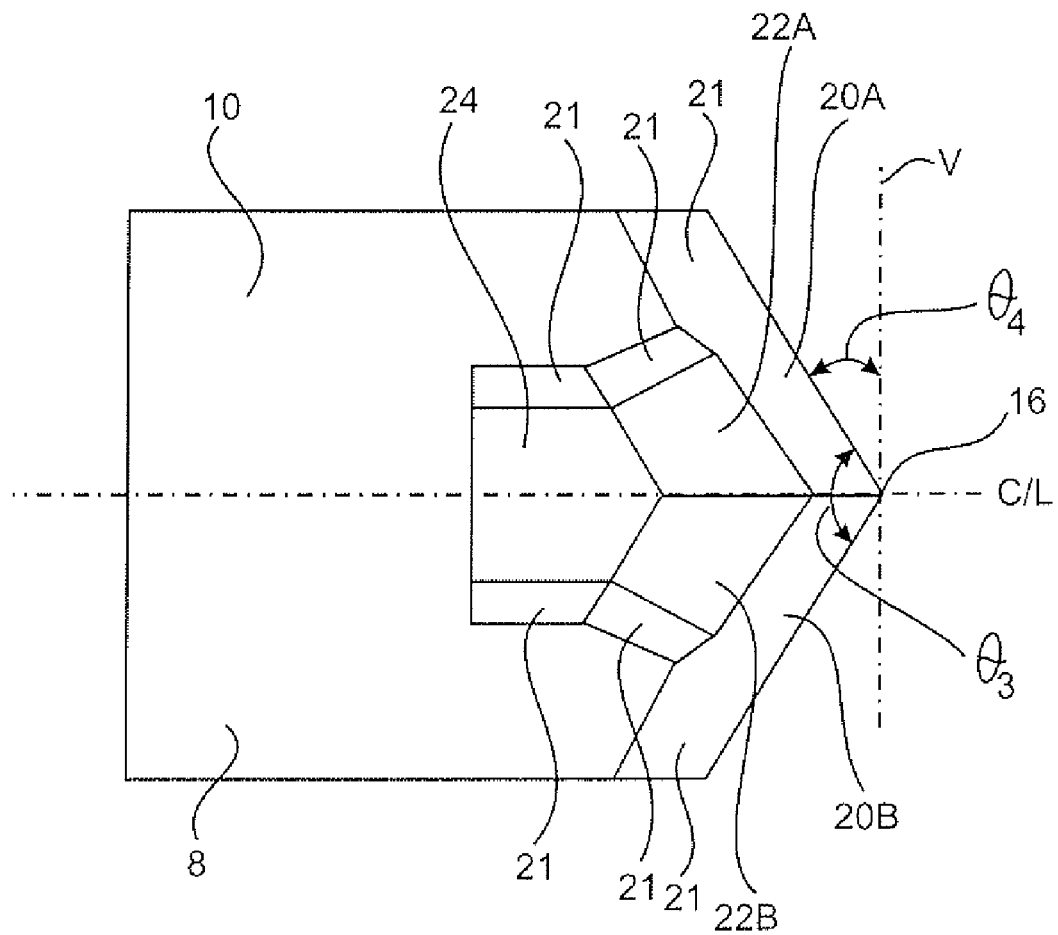
FIG. 3C shows a plan view of the embodiment shown in FIGS. 3A and 3B.

A further embodiment of the shield 2 is shown in FIGS. 3A and 3B where the first deflecting portion 6A remains substantially similar to the previous embodiment and the second deflecting portion 6B comprises a first deflecting element 20A and a second deflecting element 20B arranged to establish the "V" shape form for deflecting any force 3A that may emanate from behind the occupant in accordance with direction R. Additional third deflecting element 22A and fourth deflecting element 22B are joined or coupled adjacent the edges of deflecting elements 20A and 20B respectively to establish a substantially vertically extending second apex edge 16 defined by the apex of the "V" arrangement. The transition between the first deflecting portion 6A and the second deflecting portion 6B is provided by deflecting elements 18A, 18B, 18C and 18D, further defining the second apex edge 16. With reference to FIG. 3C, first deflecting element 20A and second deflecting element 20B are oriented so that a second internal angle $\theta_3$ is formed between deflecting elements 22A and 22B such that the second internal angle $\theta_3$ is not less than 0 degrees nor greater than 180 degrees. As with the first deflecting portion 6A, the combination of the third deflecting element 22A and the fourth deflecting element 22B may not be disposed with the seat 7 centrally located therebetween, but rather the center of the seat 5 could be off-set and/or oriented at any first external angle $\theta_4$ from a vertical plane V.

Figure 8B:
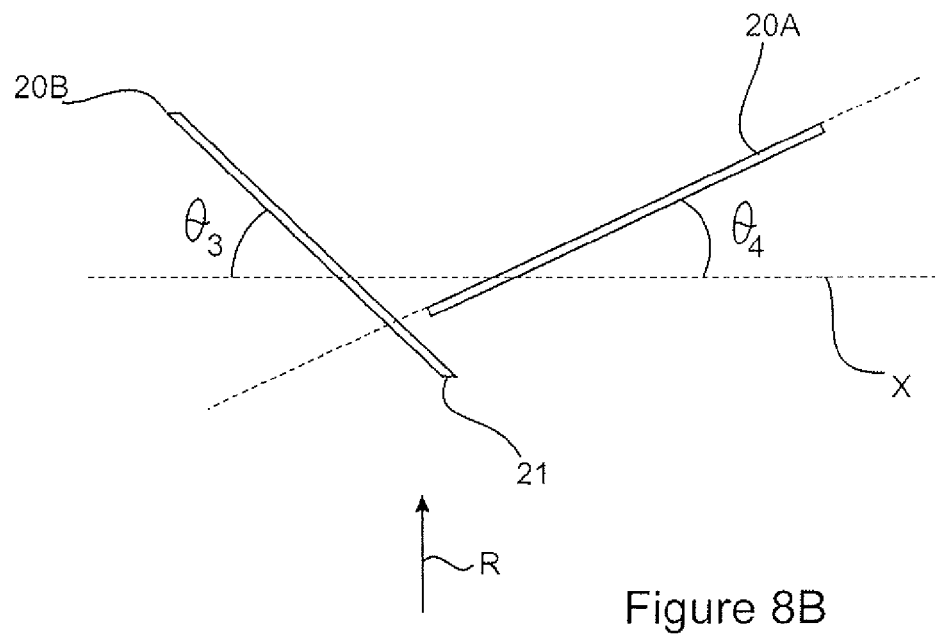
FIG. 8B shows a rear sectional view of an alternative arrangement of the second deflecting portion in accordance with the present invention.

It will be appreciated that deflecting elements 20A and 20B and/or 22A and 22B may be arranged so that the second apex edge 16 comprises an edge of either deflecting element that is positioned distal to the point of connection of said elements as shown in FIG. 8B. For the arrangement shown, the distal-most edge of deflecting element 20A forms the apex 16 of the generally "V" shaped arrangement. Similar joining or coupling arrangements may also be used as have been previously described with respect to that of the first deflecting portion 6A.

It will be appreciated that the deflecting elements of the second deflecting portion 6B may be arranged in many configurations known to one skilled that will provide for an overall "V" shaped cross-sectional form.

Figure 4:
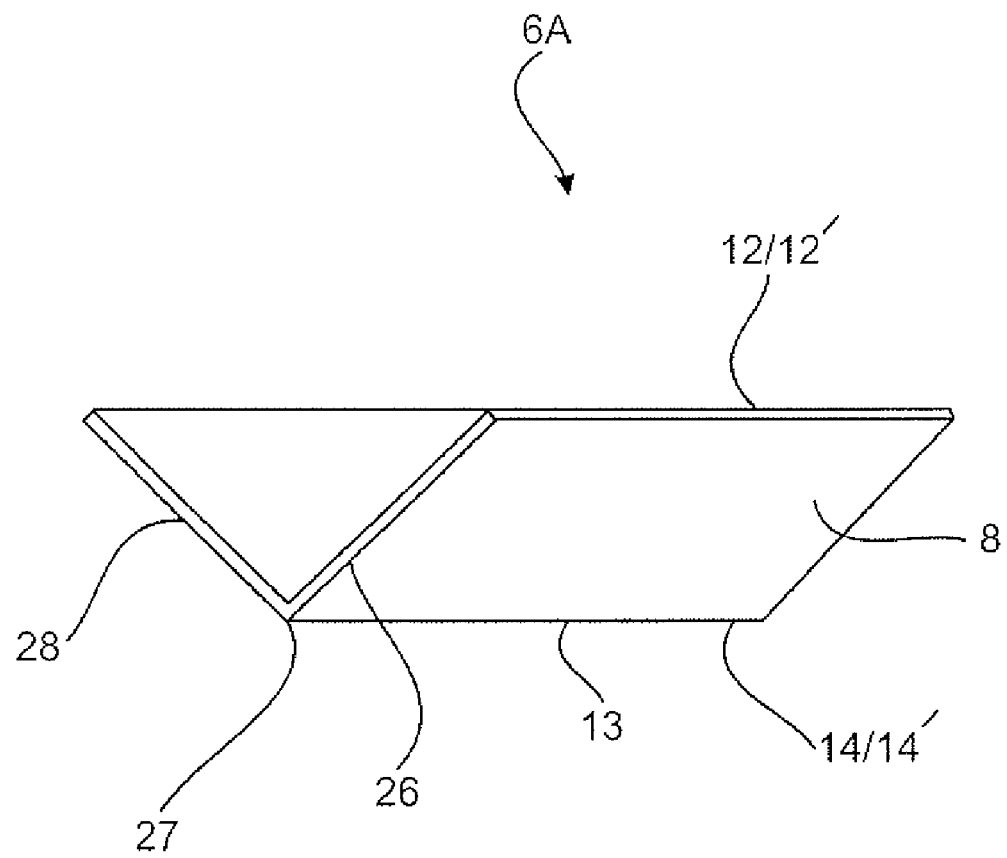
FIG. 4 shows a side elevation view of a further embodiment of the first deflecting portion in accordance with the present invention.

A further embodiment of the first deflecting portion 6A is shown in FIG. 4. In this embodiment, additional deflecting elements 28 and 26 are arranged to define a third apex edge 27 to provide a similar "V" shaped cross-sectional form for providing enhanced protection to an occupants' feet when subjected to force 3A emanating from beneath the shield 2. For the embodiment shown, the arrangement of deflecting elements 28 and 26 is such that the third apex edge 27 is substantially orthogonal to the first apex edge 13.

Figure 5A:
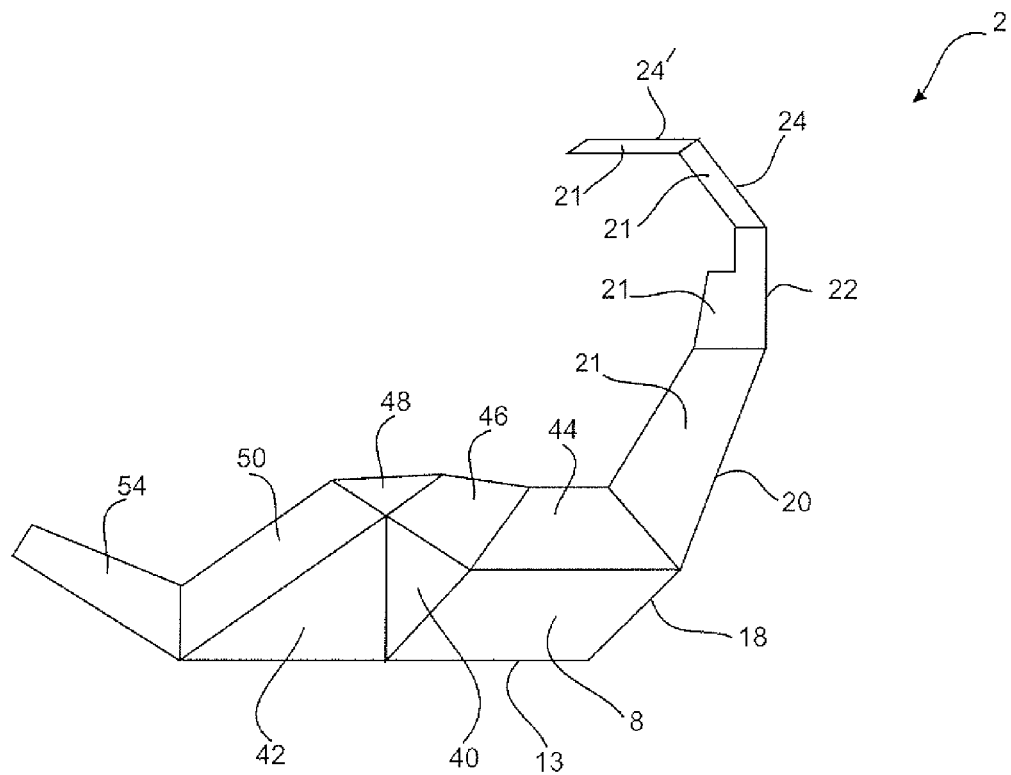
FIG. 5A shows a side elevation view of yet a further embodiment in accordance with the present invention.
Figure 5B:
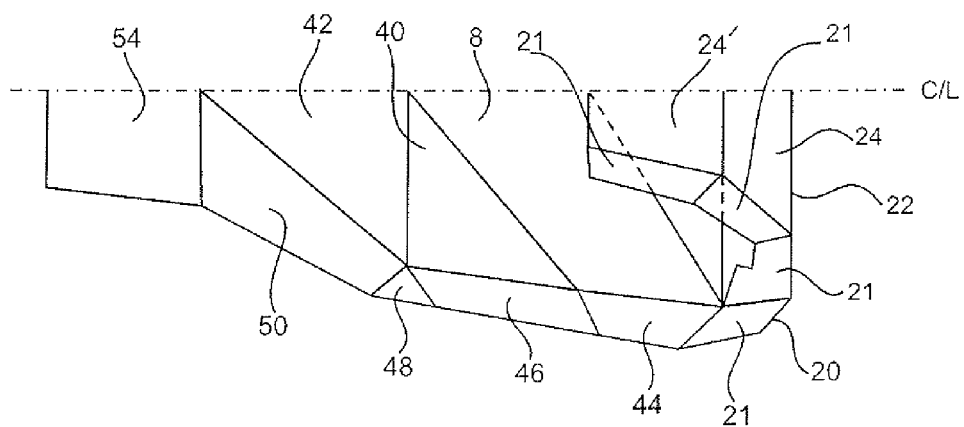
FIG. 5B shows a plan view cut along a center line $C_L$ of the embodiment shown in FIG. 5A; and, FIG. 6A shows a side elevation view of still another embodiment of the present invention.

FIGS. 5A and 5B show yet a further embodiment of the shield 2 where the first deflecting portion 6A is modified to be joined or coupled to additional deflecting elements to provide increased deflecting surface area, and thus shielding capability, to the occupant 4 (not shown). For the embodiment shown, deflecting elements 40, 42, 44, 46, 48, 50 and 54 are joined or coupled to respective adjacent deflecting elements 8 and 10 and arranged so that a distal edge of at least deflecting elements 44, 46, 48, 50 and 54 extends outwardly from the longitudinal center line $C_L$ (FIG. 5B) to create a "flared" periphery to protect an occupants arms. Alternatively, in a further embodiment, deflecting portions 8, 40 and 42 may be arranged at any angle to respective adjacent deflecting elements as required by the circumstance and application.

Figure 6A:
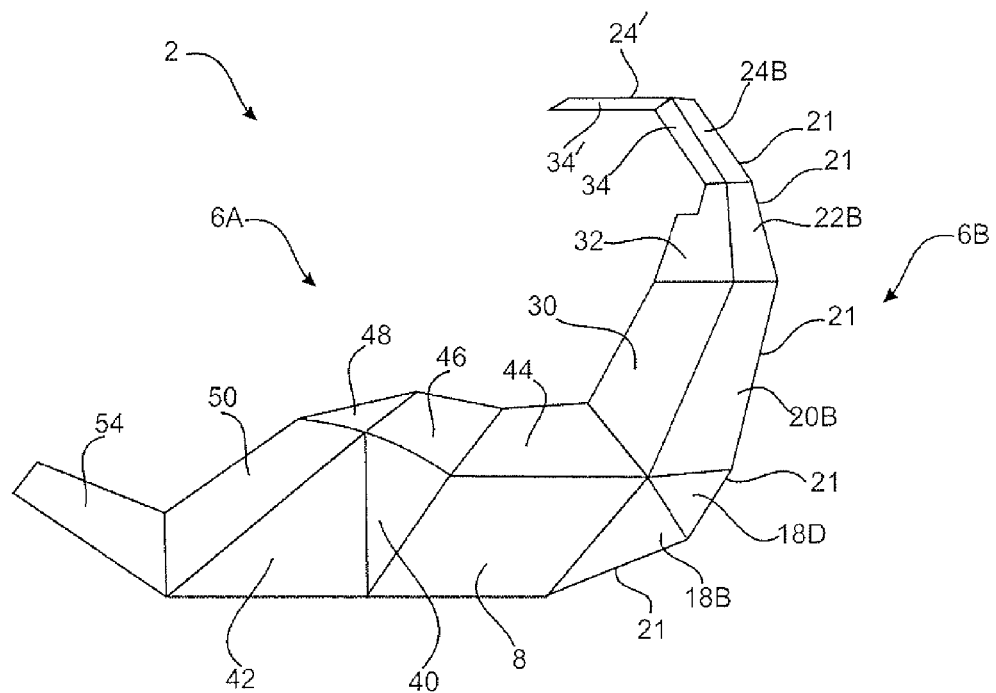
FIG. 6B shows a plan view cut along a center line CL of the embodiment shown in FIG. 6A.
Figure 6B:
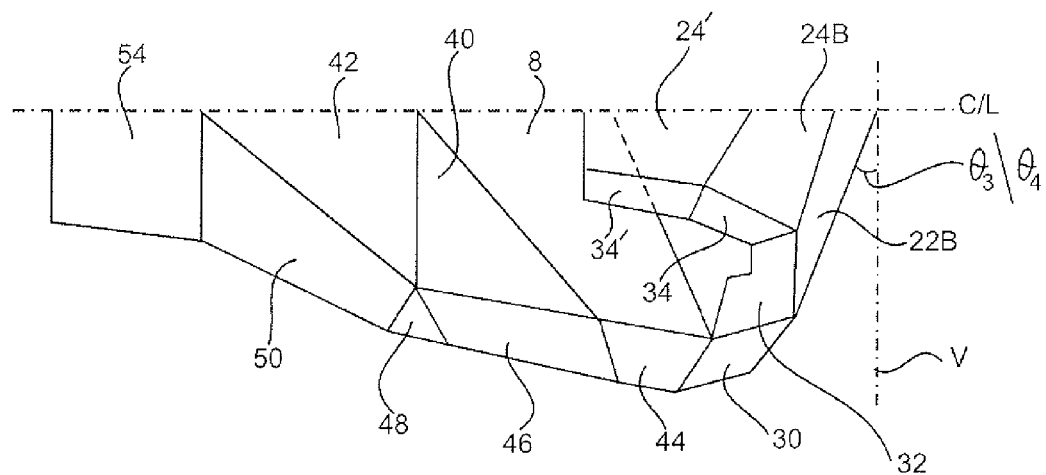

FIGS. 6A and 6B show another embodiment of the shield 2 where the embodiment of the second deflecting portion 6B shown in FIG. 3A has been integrated with the embodiment of the first deflecting portion 6A shown in FIG. 5A. It will be appreciated that any arrangement and number of deflecting elements may be used to define the second apex edge 16 and establish and/or approximate the general "V" shape cross-section to deflect a force emanating from either beneath or behind the seat. For the embodiment shown, deflecting elements 30, 32, 34 and 36 are joined or coupled to respective adjacent deflecting elements 20A, 22A, 24A and 24 and arranged so that a distal edge of at least deflecting elements 32, 34 and 36 extends outwardly from the longitudinal center line $C_L$ (FIG. 6B) to create a "flared" periphery to protect an occupants upper body and head. Alternatively, in a further embodiment, deflecting portions 20A, 22A, 24A and 24 may be arranged at any angle to respective adjacent deflecting elements as required by the circumstance and application.

Figure 7:
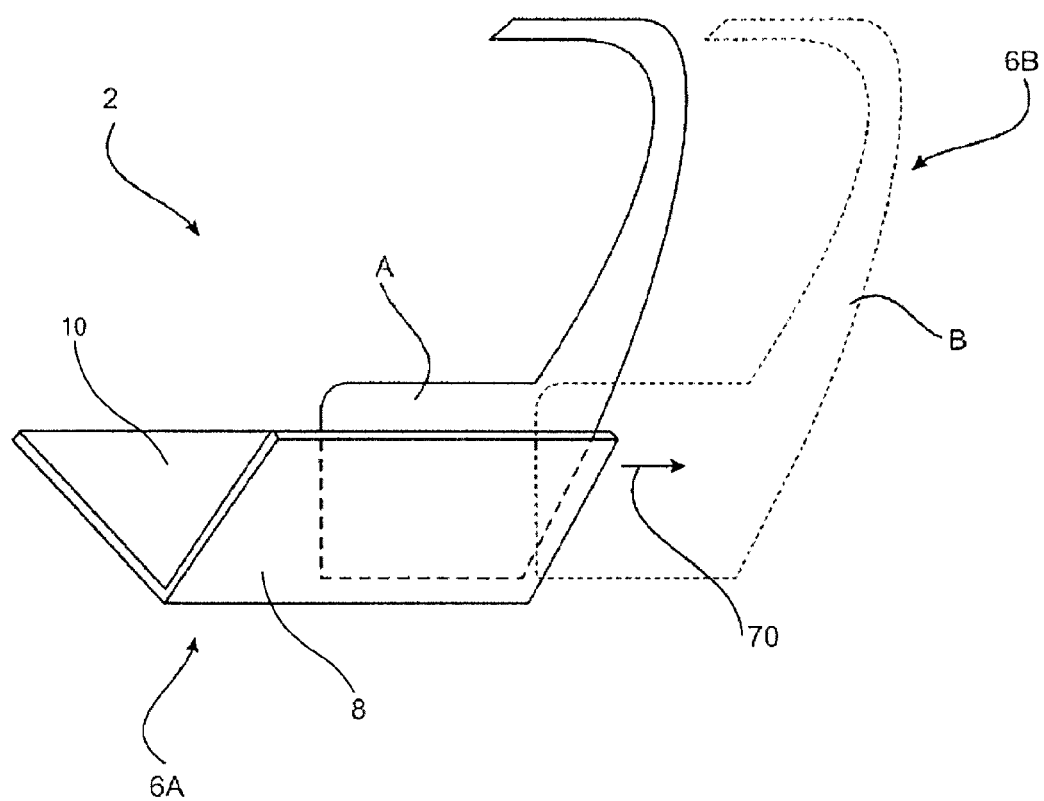
FIG. 7 shows a side elevation view of still another embodiment of the present invention.

A further embodiment of the shield 2 is shown in FIG. 7. In this embodiment, the first deflecting portion 6A and the second deflecting portion 6B are formed as separate components so that each portion may be configured or arranged to be movable relative each other. In one arrangement, the first deflecting portion 6A is arranged to be fixed relative to the floor pan structure of a vehicle and the second deflecting portion 6B is configured so that it is movable from a first position A toward a second position B. Alternatively, the second portion 6B may be arranged to be fixed and the first deflecting portion 6A is movable so that relative positions A and B may be achieved.

The relative motion may be achieved where the second deflecting portion 6B is configured so that it either fits within the first deflecting portion 6A (FIG. 7) or about the first deflecting portion 6A (not shown). In the first instance, the external surface of the second deflecting portion 6B, on each opposing side, may be provided with at least one guiding means that is engagable with a complimentary receiving means formed on an internal surface of deflecting elements 8 and 10 of the first deflecting portion 6A. The receiving and guiding means (not shown) may be configured so that motion is permitted only in a direction parallel to the first apex edge 13 by the use of friction reducing elements such as, for example, roller bearings. Alternatively, the internal surface of deflecting elements 8 and 10 of the first deflecting portion 6A may be integrally formed with the guiding means and configured to be engagable with a receiving means formed integrally on the external deflecting portions of the second deflecting portion 6B. It will be appreciated by one skilled in the art that any means of achieving the relative motion of portions 6A and 6B may be employed for enabling the embodiment shown in FIG. 7. Further, any known means of providing telescoping arrangements between the first 6A portion and second 6B portion may be used to achieve the desired relative motion.

In all of the embodiments of the shield 2 described herein, the first portion 6A may be attached directly to the floor structure of a vehicle. In the majority of cases, the vehicle concerned will have a floor pan or a chassis which can be used to support attachment of the shield 2 to the vehicle. The attachment arrangement may be such that the shield 2 is removable so that the shield 2 may be replaced when damaged. Further, the seat 5 may also be removably attached to the shield 2 so that the seat may be replaced as required. Furthermore, the shield 2 may be configured to be suspended from the roof structure of a vehicle.

Any of the embodiments of the shield 2 described herein may be used within any vehicle comprising any one of the following:
(i) an automobile;
(ii) a truck;
(iii) a military tank
(iv) an armoured truck;
(v) an aircraft;
(vi) a helicopter;
(vii) sea vehicle (i.e., boat, ship etc);
(viii) Land Craft Air Cushion (LCAC);
(ix) hovercraft;
(x) landing craft.

The shield 2 may be formed from any material known in the art having high strength and durability characteristics. Materials may include, for example, composite materials, such as Kevlar®, carbon and fibreglass configurations for applications where low weight and high strength is of high priority. However, forms of high strength steel and aluminium may also be used, either individually or in combination with other materials, such as composites, for vehicles where weight is not critical. It will be readily appreciated that the shield may be formed from any suitable material or material combination known to one skilled in the art.

With reference to all of the embodiments described herein, any or each of the deflecting elements comprising the or each of the deflecting portions may be either joined or coupled to adjacent deflecting elements using any mechanical fastening means known in the art, such as, for example nut/bolt arrangements, or by using standard weld methodologies. Furthermore, any or all deflecting elements comprising the or each deflecting portion may be formed integral with each other so as to form a monocoque structure.

Numerous variations and modifications will suggest themselves to persons skilled in the relevant art, in addition to those already described, without departing from the basic inventive concepts. Such variations may include the attachment means used to secure adjacent deflecting elements together. In some embodiments it is envisaged that a rigid coupling will be used. It will be appreciated, however, that a hinged attachment may also be used so that the orientation of respective adjacent deflecting surfaces may be changed or altered relative one another and secured in position. All such variations and modifications are to be considered within the scope of the present invention, the nature of which is to be determined from the foregoing description.

What is claimed is:

1. A shield configured for use within a vehicle for protecting an occupant of a seat in the vehicle from a force emanating from at least a region beneath said occupant, the seat having a supporting surface for supporting an occupant, said shield comprising:
   a deflecting member having more than one deflecting portion for deflecting said force away from said seat,
      wherein said deflecting member is positioned near a side of said seat opposite said supporting surface of said seat, said more than one deflecting portions being inclined in a direction toward each other at a first edge and away from the seat at a second edge,
      wherein said more than one deflecting portion comprises a first deflecting portion having first and second deflecting surface portions, and
   wherein said first and second deflecting surface portions converge toward each other at a first edge and away from said seat at a second edge.

2. A shield according to claim 1, wherein said first and second deflecting surface portions are arranged relative one another so that a first internal angle formed between each of said respective surface portions is greater than 0 degrees and less than 180 degrees.

3. A shield according to claim 2, wherein said supporting surface is positioned substantially central to the first and second deflecting surface portions.

4. A shield according to claim 1, wherein said first and second deflecting surface portions are arranged opposite one another to form a substantially "V" shaped arrangement, and
   wherein an apex of said "V" shaped arrangement defines a first apex edge for deflecting the force away from said set when the force emanates from beneath the shield.

5. A shield according to claim 4, wherein said first apex edge is distal of, and substantially central of, said seat.

6. A shield according to claim 4, further comprising a second deflecting portion coupled to and extending substantially away from said first deflecting portion for protecting a rear side of said occupant.

7. A shield according to claim 6, wherein said second deflecting portion comprises third and fourth deflecting surface portions arranged relative one another so that a second internal angle is formed between each of said respective surface portions, said angle being greater than 0 degrees and less than 180 degrees.

8. A shield according to claim 7, wherein each of said third and fourth deflecting surface portions converge towards each other at one edge.

9. A shield according to claim 8, wherein said supporting surface is positioned substantially central to said third and fourth deflecting surface portions.

10. A shield according to claim 7, wherein a cross-sectional shape of the second deflecting portion is substantially a "V" shape, and
    wherein an apex of said "V" shape of the second deflecting portion defines a second apex edge arranged between the seat and a rear of the vehicle for deflecting force away from the seat when a force originates from behind the shield.

11. A shield according to claim 10, wherein said second apex edge is distal of, and substantially central of, said seat.

12. A shield according to claim 6, wherein the second deflecting portion is movable relative to said first deflecting portion.

13. A shield according to claim 12, wherein the second deflecting portion is operatively associated with the first deflecting portion in a telescoping arrangement.

14. A shield according to claim 6, wherein said first and second deflecting portions are configured with more than one deflecting surface portions.

15. A shield according to claim 10, further comprising additional deflecting surface portions arranged to protect the occupant's head from contacting a ceiling of the vehicle.

16. A shield according to claim 1, wherein the vehicle comprises anyone of the following:
   (i) an automobile;
   (ii) a truck;
   (iii) a military tank
   (iv) an armoured truck;
   (v) an aircraft;
   (vi) a helicopter;
   (vii) sea vehicle (i.e., boat, ship etc);
   (viii) Land Craft Air Cushion (LCAC);
   (ix) hovercraft;
   (x) landing craft.

17. A shield configured for use within a vehicle for protecting an occupant of a seat in the vehicle from a force emanating from at least a region beneath said occupant, the seat having a supporting surface for supporting an occupant, said shield comprising:
   a deflecting member having more than one deflecting portion,
   wherein said deflecting member is positioned near a side of said seat opposite said supporting surface of said seat, said more than one deflecting portions being formed in a substantially convex manner about said seat for deflecting said force away from said seat,
   wherein said deflecting member has a cross-sectional shape that is substantially a "V" shape, and
   wherein an apex of said "V" shape defines a first apex edge arranged to be positioned between the seat and a floor of the vehicle for deflecting force away from the seat when the force originates from beneath the shield.

18. A shield according to claim 17, wherein said first apex edge is distal of, and substantially central of, said seat.

19. A shield according to claim 17, further comprising a second deflecting portion coupled to and extending substantially away from said first deflecting portion for protecting the rear side of said occupant.

20. A shield according to claim 19, wherein a cross-sectional shape of the second deflecting portion is substantially a "V" shape, and
   wherein an apex of said "V" shape of the second deflecting portion defines a second apex edge arranged intermediate the seat and the rear of the vehicle for deflecting force away from the seat when a force originates from behind the shield.

21. A shield according to claim 20, wherein said second apex edge is distal of, and substantially central of, said seat.

22. A shield according to claim 20, wherein the second deflecting portion is movable relative said first deflecting portion.

23. A shield according to claim 22, wherein the second deflecting portion is operatively associated with the first deflecting portion in a telescoping arrangement.

24. A shield according to claim 20, further comprising additional deflecting surface portions are arranged to protect the occupant's head from contacting a ceiling of the vehicle.

25. A seat configured for use within a vehicle for protecting a seated occupant from a force coming from a direction from a region at least beneath said occupant, said seat comprising:
   a supporting surface for supporting an occupant; and
   a shield positioned near a side of the seat opposite the supporting surface shaped for deflecting said force away from said seat, the shield comprising:
   a deflecting member having more than one deflecting portion for deflecting said force away from said seat,
   wherein said deflecting member is positioned near a side of said seat opposite said supporting surface of said seat, said more than one deflecting portions being inclined in a direction toward each other at a first edge and away from the seat at a second edge, and
   wherein said more than one deflecting portion comprises a first deflecting portion having first and second deflecting surface portions wherein said first and second deflecting surface portions converge toward each other at a first edge and away from said seat at a second edge.

26. A seat according to claim 25, wherein said seat is configured to be removably attached to said shield.

27. A seat according to claim 25, wherein said seat is formed integral with said shield.

28. A method of augmenting occupant safety in a vehicle, the method comprising:
   installing a shield about an occupant seat of the vehicle, the shield being configured to deflect a force emanating from beneath the seat away from the seat, wherein the shield comprises:
   a deflecting member having more than one deflecting portion for deflecting said force away from said seat,
   wherein said deflecting member is positioned near a side of said seat opposite said supporting surface of said seat, said more than one deflecting portions being inclined in a direction toward each other at a first edge and away from the seat at a second edge, and
   wherein said more than one deflecting portion comprises a first deflecting portion having first and second deflecting surface portions wherein said first and second deflecting surface portions converge toward each other at a first edge and away from said seat at a second edge.

29. The method according to claim 28, wherein the step of installing said shield includes mounting the shield on at least one surface of the vehicle so that the deflecting member is disposed between the seat and the at least one mounting surface.

30. A method according to claim 28, wherein the vehicle comprises any one of the following:
   (i) an automobile;
   (ii) a truck;
   (iii) a military tank
   (iv) an armoured truck;
   (v) an aircraft;
   (vi) a helicopter;
   (vii) sea vehicle (i.e., boat, ship etc);
   (viii) Land Craft Air Cushion (LCAC);
   (ix) hovercraft;
   (x) landing craft.

* * * * *